United States Patent
Chen et al.

(10) Patent No.: US 7,998,558 B2
(45) Date of Patent: Aug. 16, 2011

(54) GLASS SHEET WITH PROTECTED EDGE, EDGE PROTECTOR AND METHOD FOR MAKING GLASS SHEET USING SAME

(75) Inventors: Xin Chen, Corning, NY (US); Anping Liu, Big Flats, NY (US); Ji Wang, Painted Post, NY (US); Liming Wang, Painted Post, NY (US); Wei Xu, Painted Post, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 353 days.

(21) Appl. No.: 12/394,191

(22) Filed: Feb. 27, 2009

(65) Prior Publication Data

US 2010/0221501 A1    Sep. 2, 2010

(51) Int. Cl.
 *B32B 23/02*  (2006.01)
 *B32B 17/06*  (2006.01)

(52) U.S. Cl. ........ 428/194; 428/192; 428/193; 428/200; 428/210; 428/409; 428/426; 156/60

(58) Field of Classification Search .............. 428/32, 428/37, 87, 98, 192, 193, 194, 200, 210, 428/409, 426; 156/60
See application file for complete search history.

(56) References Cited

U.S. PATENT DOCUMENTS

| | | | |
|---|---|---|---|
| 3,338,696 A | 8/1967 | Dockerty | 65/145 |
| 3,682,609 A | 8/1972 | Dockerty | 65/83 |
| 4,443,508 A * | 4/1984 | Mehl | 428/122 |
| 4,775,570 A * | 10/1988 | Ohlenforst et al. | 428/83 |
| 5,021,279 A * | 6/1991 | Whitener | 428/100 |
| 5,674,790 A | 10/1997 | Araujo | 501/66 |
| 6,187,409 B1 * | 2/2001 | Mathieu | 428/70 |
| 6,487,879 B1 | 12/2002 | Blackwell et al. | 65/414 |
| 6,998,776 B2 | 2/2006 | Aitken et al. | 313/512 |
| 7,407,423 B2 | 8/2008 | Aitken et al. | 445/25 |
| 2005/0090189 A1 | 4/2005 | Brown et al. | 451/41 |

* cited by examiner

*Primary Examiner* — Gwendolyn Blackwell
(74) *Attorney, Agent, or Firm* — Siwen Chen

(57) ABSTRACT

A glass sheet assembly includes a glass sheet having an edge surface and a shaped fiber. The shaped fiber has a first surface bonded to the edge surface of the glass sheet and a convex second surface not bonded to the edge surface for receiving a load.

20 Claims, 9 Drawing Sheets

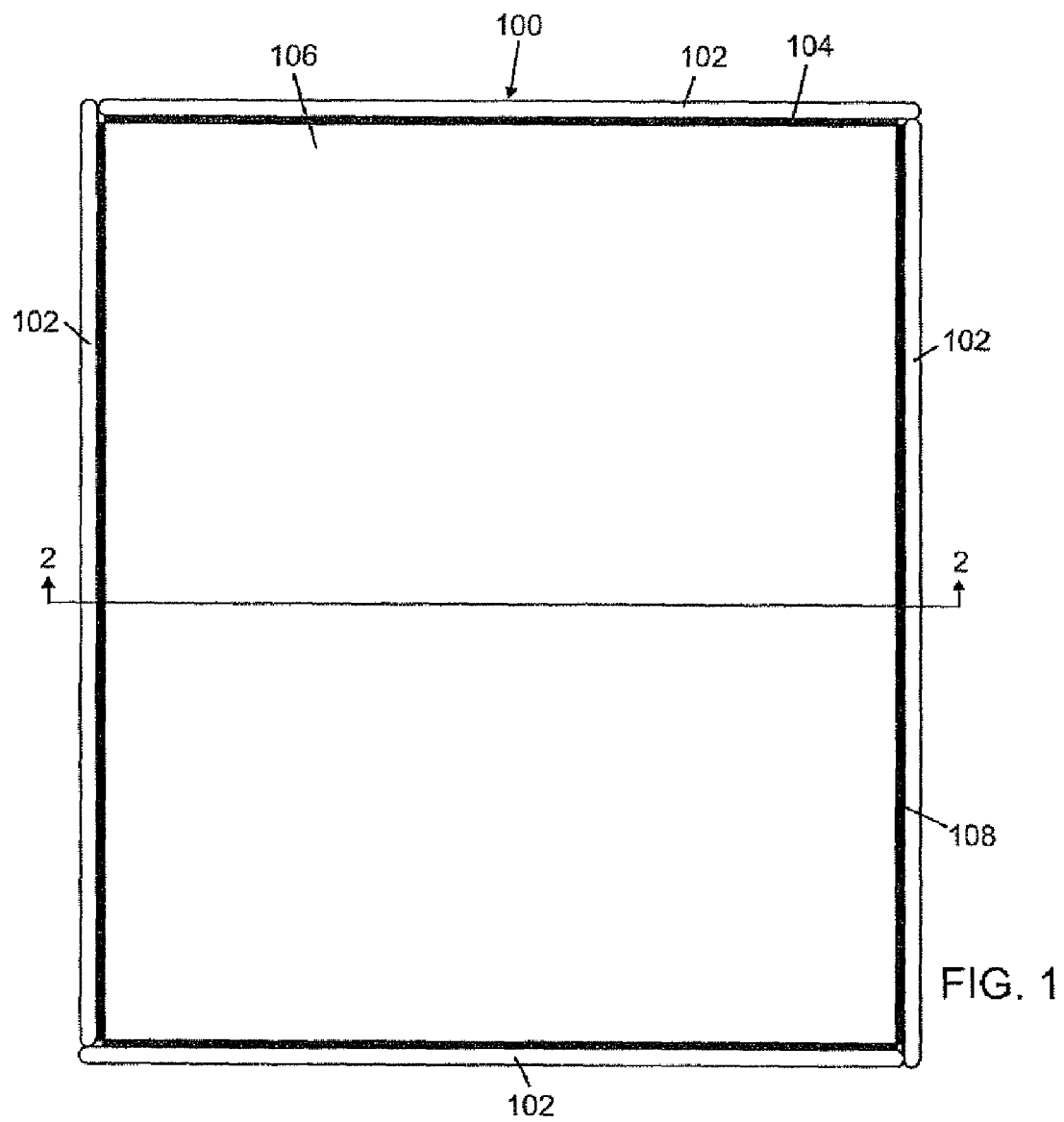
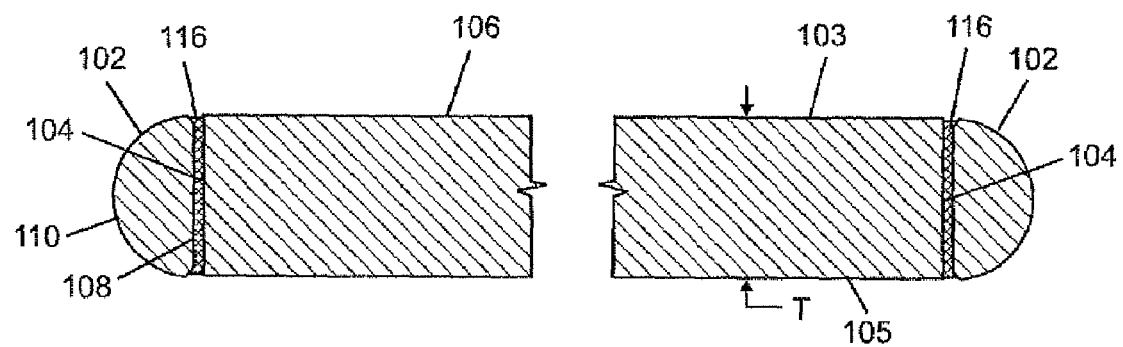
FIG. 1
FIG. 2

GLASS SHEET WITH PROTECTED EDGE, EDGE PROTECTOR AND METHOD FOR MAKING GLASS SHEET USING SAME

TECHNICAL FIELD

The invention relates generally to post-forming operations for glass sheets. More specifically, the invention relates to a method and apparatus for protecting edges of s glass sheets. The present invention especially relates to improving the strength of as cut edges of glass sheets and replacing traditionally costly edge-finishing process and equipment. The present invention can be useful, e.g., for improving the glass edge quality of a LCD glass substrate.

BACKGROUND

Various applications demand high-quality large-sized glass sheets. Examples include liquid crystal displays (LCD), other types of flat panel displays, e.g., plasma displays, field emission displays, and organic light-emitting polymer displays, and photovoltaic panels. Fusion draw process is one of the few processes capable of delivering glass sheets without requiring costly surface post-forming finishing operations such as lapping and polishing. Fusion draw process is described in U.S. Pat. No. 3,682,609 (hereinafter the "'609 Patent") and U.S. Pat. No. 3,338,696 (hereinafter the "'696 Patent"). Typically, the fusion draw process involves delivering molten glass into a trough and overflowing the molten glass down the sides of the trough in a controlled manner. The separate streams of molten glass flowing down the sides of the trough merge at the root of the trough into a single stream of molten glass, which is drawn into a continuous glass sheet. The continuous glass sheet is separated into discrete pieces at the bottom of the fusion draw machine. A key advantage of this process is that the surfaces of the glass sheet do not come in contact with the sides of the trough or other forming equipment and therefore are pristine (See col. 1, lines 45-50 of the '696 Patent). Another benefit of the process is that the drawn glass sheet can have a uniform thickness (See the '609 Patent).

Post-forming operations include cutting the glass sheets into desired shapes and sizes. Cutting is typically by mechanical scoring. As-cut square glass sheet edges chip easily and have low impact strength. Due to the nature of glass, a tiny crack at an edge of the glass sheet can propagate across the glass sheet, rendering the glass sheet useless. The traditional approach to avoiding damage to the cut glass sheet is to finish the as-cut edges of the glass sheet by grinding and/or polishing. In addition to being expensive, this approach often generates micron-sized glass particles that can contaminate the quality surfaces of the glass sheet. The quality surfaces are required to have a high degree of cleanliness and be free from scratches. Extensive washing and drying at the end of the finishing process are needed to clean and wash off the generated particles. In some cases, some of these particles can irreversibly adhere to the clean glass surface, rendering the glass sheet useless for many applications.

Laser scoring can create better as-cut edges than mechanical scoring. However, as-cut square edges, even if produced by laser scoring, will typically not have the impact strength necessary to avoid damage to the glass sheet in down-stream glass handling and processing steps. The key challenge is to provide a high-strength edge without subsequent finishing processes such as grinding, polishing, and washing. Patent application publication No. US 2005/0090189 (Brown et al.) describes a removable grinding shroud that may be used to protect the surfaces of the glass sheet from generated particles during grinding of the as-cut edges of the glass sheet. The grinding shroud is detached from the glass sheet once the grinding process is completed and not used when the edges of the glass sheet are polished. The edge finishing process is costly, and even with a shroud technology, it is difficult to finish the glass sheet without depositing particles on the glass surface.

SUMMARY

Several aspects of the present invention are disclosed herein. It is to be understood that these aspects may or may not overlap with one another. Thus, part of one aspect may fall within the scope of another aspect, and vice versa. Unless indicated to the contrary in the context, the differing aspects shall be considered as overlapping with each other in scope.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa. Unless indicated to the contrary in the context, the differing embodiments shall be considered as overlapping with each other in scope.

In a first aspect, the invention relates to a glass sheet assembly. The glass sheet assembly comprises a glass sheet having an edge surface. The glass sheet assembly further comprises a shaped fiber having a first surface bonded to the edge surface of the glass sheet and a convex second surface not bonded to the edge surface for receiving a load.

In a first embodiment of the first aspect, the first surface and the edge surface are essentially flat.

In a second embodiment of the first aspect, the ratio of the width of the shaped fiber to the width of the edge surface is in the range from 0.8 to 1.2.

In a third embodiment of the first aspect, the shaped fiber is made of a glass material.

In a fourth embodiment of the first aspect, the edge surface of the glass sheet has a first impact strength IS1 when not bonded to the shaped fiber; the glass sheet assembly has a second impact edge strength IS2; and IS1 is at most half of IS2.

In a fifth embodiment of the first aspect, the edge surface is as-cut and without further grinding and polishing.

In a sixth embodiment of the first aspect, the edge surface, if rounded and ground, has a first static contact strength SC1; the glass sheet assembly has a second static contact strength SC2; and SC2≧SC1. In certain specific embodiments, the edge surface is as-cut and without further grinding and polishing.

In a seventh embodiment of the first aspect, the shaped fiber and the glass sheet have approximately the same coefficient of thermal expansion in the temperature range of 0-300° C.

In an eighth embodiment of the first aspect, the bonding material bonding the shaped fiber to the edge surface is selected from (i) a glass frit material, (ii) an organic adhesive, and (iii) a combination of (i) and (ii).

In a ninth embodiment of the first aspect, the shaped fiber essentially encloses all the edge surfaces of the glass sheet.

In a tenth embodiment of the first aspect, the glass sheet has a rounded corner protected by the shaped fiber.

In an eleventh embodiment of the first aspect, the shaped fiber is a glass fiber and the surface of the glass fiber is doped with titanium.

In a twelfth embodiment of the first aspect, the shaped fiber has an ion-exchanged surface.

In a thirteenth embodiment of the first aspect, the shaped fiber comprises an organic polymer, in certain specific embodiments consists essentially of an organic polymer, in certain other specific embodiments consists of an organic polymer.

In a second aspect, the invention relates to a method of protecting a glass sheet having an edge surface to be protected. The method comprises (I) providing a shaped fiber having a first surface to be bonded to the edge surface and a convex second surface, (II) positioning the first surface of the shaped fiber in opposing relation to the edge surface of the glass sheet, and (III) bonding the first surface of the shaped fiber to the edge surface of the glass sheet.

In a first embodiment of the second aspect, in step (I), the first surface of the fiber is essentially planar.

In a second embodiment of the second aspect, in step (I), the first surface of the shaped fiber comprises a protective coating and prior to step (III), the protective coating is removed.

In a third embodiment of the second aspect, step (I) comprises (Ia) providing a preform having a D-shaped cross-section and (Ic) drawing the D-shaped preform into a fiber having an approximately D-shaped cross-section.

In a fourth embodiment of the second aspect, in step (Ia), the preform is made of an inorganic glass material.

In a fifth embodiment of the second aspect, step (I) further comprises, after step (Ic), subjecting the D-shaped fiber to ion-exchange.

In a sixth embodiment of the second aspect, step (I) further comprises, between step (Ia) and step (Ic), subjecting the D-shaped fiber preform to Ti-doping.

Other features of the invention will be apparent from the description of embodiments and the claims.

One or more embodiments of one or more aspects of the present invention has one or more of the following advantages:

First, the fibers bonded to the edge surface of the glass sheet can provide excellent protection to the edge surface of the glass sheet. Theoretical simulation indicates that certain glass sheet edge protectors provide similar edge strength performance as a perfectly formed round edge, which is much higher than current ground round edge.

Second, the use of shaped fiber at the edge surfaces of the glass sheet can be more cost-effective compared to other, traditional edge finishing techniques: it could reduce or eliminate additional edge preparation processes such as grinding and polishing. The shaped fiber, if made of a glass material, can be massively produced at relatively low cost using existing fiber production facility. Washing and drying stations can be eliminated or significantly simplified.

Third, the reduction and/or elimination of edge grinding and/or polishing solves the problem of glass particle generation and adhesion to sheet surface due to grinding and polishing. Glass particles produced by grinding can scratch the glass surface and cause defect in films to be deposited on the surface, and therefore require rigorous and thorough cleaning.

Last but not least, fiber edge protection can be very easy to implement. The shaped fibers can be secured to the edges of the glass sheet by bonding material. Bonding of the shaped fibers to the edges of the glass sheet can be achieved in a relatively simple setup and thus not require additional investing in expensive capital equipments.

The protection provided by the fibers eases edge quality requirements for the glass sheet. It is not necessary for the glass sheet to have a perfectly finished edge in order to benefit from the glass sheet edge protectors. Bonding material between the shaped fiber and the edges of the glass sheet can fill irregular gaps in the edges of the glass sheet to form a thin layer of strong bond between the shaped fiber and the edges of the glass sheet.

Additional features and advantages of the invention will be set forth in the detailed description which follows, and in part will be readily apparent to those skilled in the art from the description or recognized by practicing the invention as described in the written description and claims hereof as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

FIG. 1 is a schematic of a first example of a protected glass sheet.

FIG. 2 is a cross-section of the protected glass sheet of FIG. 1 along lines 2-2.

DETAILED DESCRIPTION

Figure 3:
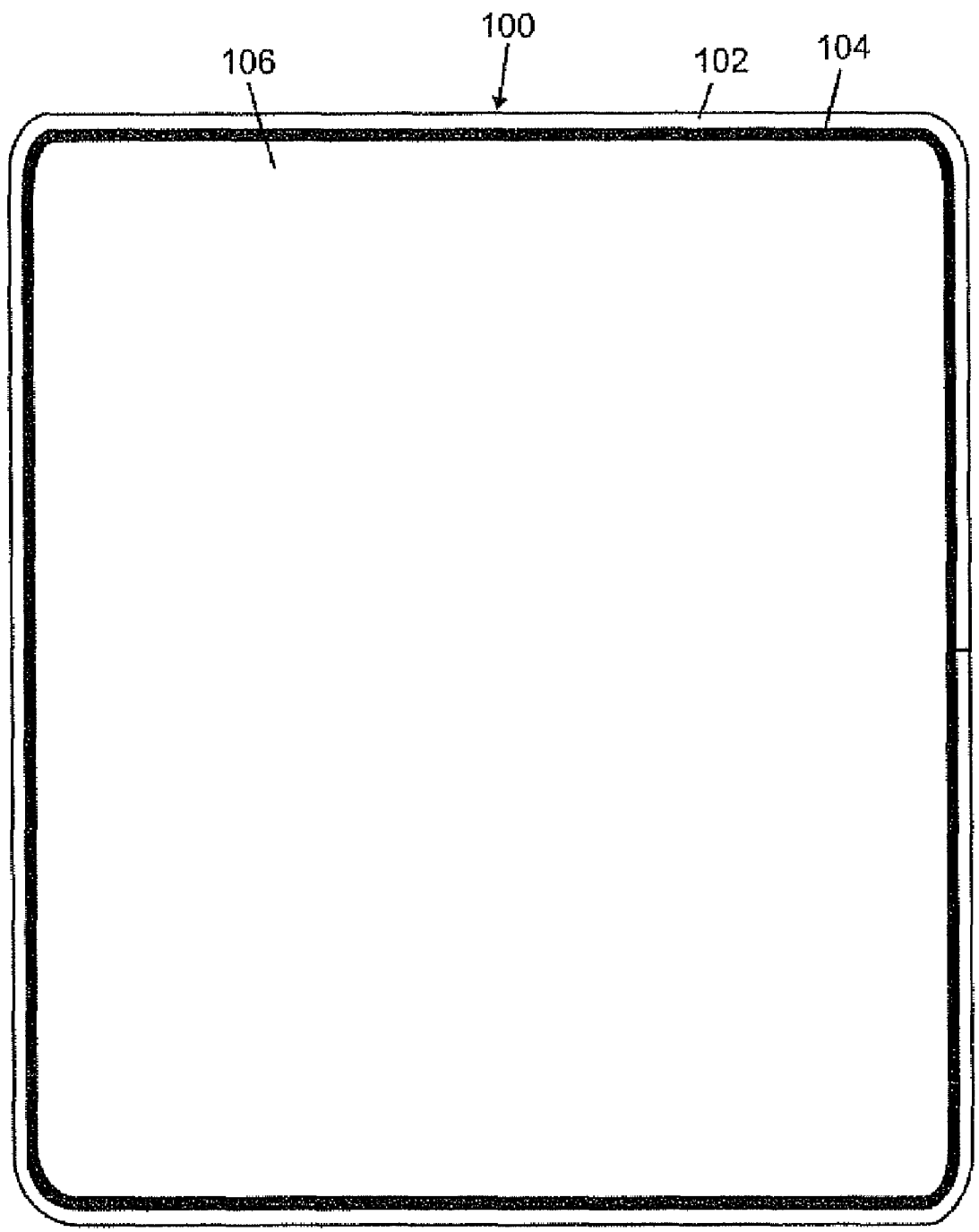
FIG. 3 is a schematic of a second example of a protected glass sheet.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, "a fiber" includes embodiments having two or more such fibers, unless the context clearly indicates otherwise.

The present invention can be applied to glass sheets produced by various forming technique, such as fusion downdraw, slot draw, float process, and the like.

As-cut edges of a glass sheet may include geometric discontinuities, e.g., cracks, sharp corners, changes in cross-sectional area, which act as stress concentrators along the edges of the glass sheet. That is, force applied to edges of the glass sheet will concentrate at these discontinuities, locally increasing the stress at these discontinuities. The glass sheet can be damaged when the stress at any of these geometric discontinuities exceed the theoretical cohesive strength of the glass. One example of a damage that can occur is propagation of a crack across the glass sheet. In addition, the as-cut edge, typically square either by traditional mechanical scoring or laser scoring, has low impact strength. Edge impact induced damage is another major cause of sheet breakage during handling. To prevent potential damage to the glass sheet, edge protectors are mounted on the edges of the glass sheet. The edge protectors intercept any force directed to the glass sheet and distribute this force over an area that is large in comparison to the area of the geometric discontinuities. As a result, the force seen by the geometric discontinuities and the resulting stress are reduced. Besides, an engineered edge protecting fiber can provide significantly higher impact strength due to round (convex) shape and minimal surface flaw.

When measuring the impact strength of the glass to be protected and the protected glass sheet assembly, a predetermined impact moment (both in terms of quantity and direction) is applied to the edge surface. The percentage of the impacts in which the tested subject survived without breakage is used as an indicator of the impact strength IS. The glass sheet prior to bonding with the protecting fiber has an impact strength IS1, and the glass sheet assembly upon bonding between the fiber and the glass sheet has an impact strength IS2. According to certain embodiments of the present invention, $IS2 \geq 2 \cdot IS1$. Thus, where $IS2 \geq 2 \cdot IS1$, if the unprotected glass sheet has a survival percentage of x, the protected glass sheet has a survival percentage of at least 2x, when subjected to the same impact moment. In certain other embodiments, $IS2 > 2.5 \cdot IS1$; in certain other embodiments, $IS2 \geq 3.0 \cdot IS1$, in certain other embodiments, $IS2 \geq 4 \cdot IS1$.

Four-point bending test is typically used to measure the static contact strength of a glass sheet or a protected glass sheet assembly. The glass sheet, if the edge surface is ground and rounded but is not bonded to the protecting fiber, has a static contact strength SC1. The protected glass sheet assembly, with the edge surface bonded to a protecting fiber, has a static contact strength SC2. Even for embodiments of the present invention where the protected glass sheet assembly comprises a glass sheet with the protected edge surface being as-cut (i.e., without further grinding and rounding), $SC2 \geq SC1$. Thus, the bonded protecting fiber provides a static contact strength enhancement at least as good as edge grinding and rounding.

Certain embodiments of the present invention will be described in detail by referencing to the appended drawings. The reference numerals in the drawings have the following meaning:

100: glass sheet assembly; 102: edge protectors, shaped fiber; 103: top surface of glass sheet; 104: edge surface(s) of glass sheet; 105: bottom surface of glass sheet; 106: glass sheet; 108: bonding surface of the protecting fiber; 110: convex surface of the protecting fiber; 112: corners of fiber cross-section; 114: corners of fiber cross-section; 116: bonding material; 120: protective coating; 122, 124: mechanical removers; 127: spring; 128: nozzle; 130: UV light source; 132: alignment fixture; 134: V-groove; 136: channel; 138: wall; 140: heating element; 150: rounded-edge glass sheet model; 152: protected glass sheet model.

FIG. 1 shows a glass sheet assembly 100 having a plurality of edge protectors 102 bonded to the edge surfaces 104 of a glass sheet 106 for the purposes of improving both contact and impact strength of the edges surfaces 104. FIG. 2 shows that the edge surfaces 104 of the glass sheet 106 are the side surfaces of the glass sheet 106 perpendicular to the top and bottom surfaces 103, 105 of the glass sheet 106 and have a width equal to the thickness T of the glass sheet 106. The edge surfaces 104 may be as-cut surfaces, i.e., surfaces which have not been finished after cutting of the glass sheet 106, which is typically flat and square. Alternatively, the edges surfaces 104 may have been subjected to finishing processes. However, use of the edge protectors 102 makes it possible to skip finishing of the edge surfaces 104 while achieving improved impact strength. In the example shown in FIG. 1, there are four edge protectors 102 bonded to the four edge surfaces 104 of the glass sheet 106. Each edge protector 102 increases the impact strength of the edge surface 104 to which it is bonded (where the impact strength of the as-cut edge surface 104 is used as a benchmark). Additional or fewer edge protectors 102 may be used to protect the edge surfaces 104 of the glass sheet 106. FIG. 3 shows an example where a single edge protector 102 is bonded to an edge 104 of a glass sheet 106 to increase the impact strength of the edge surface 104 of the glass sheet 106. In the example shown in FIG. 3, the edge surface 104 is a continuous surface, which makes it possible to use a single edge protector 102. Use of the edge protector 102 is not limited to a glass sheet having a rectangular shape, as shown in FIG. 1, or having a rectangular shape with rounded corners, as shown in FIG. 3. Each edge protector 102 may be made flexible enough to be bonded to edge surfaces with linear profiles, curved profiles, or a combination of linear and curved profiles.

Referring back to FIG. 1, it is not mandatory to bond edge protectors 102 to all the edge surfaces 104 of the glass sheet 106. It is possible, for example, to bond the edge protectors 102 to a select number of the edge surfaces 104 of the glass sheet 106 while the remaining edge surfaces 104 are either subjected to finishing operations or left as-cut. However, to gain full benefit of the invention, it is better that all the edge surfaces 104 of the glass sheet 106 are protected by one or more edge protectors 102. The edge protectors 102 can remain bonded to the edge surfaces 104 of the glass sheet 106 while the glass sheet 106 is subjected to further manufacturing steps, such as deposition of thin films on the glass surface when making LCD panels, or further handling steps. When edge protection is no longer needed, the edge protectors 102 may be removed from the glass sheet 106 using any suitable method. For example, the glass sheet 106 can be trimmed very close to the edge surfaces 104 to cut off the edge protectors 102. It may also be possible to remove the bonding material between the edge protectors 102 and the glass sheet 106. However, care must be taken not to damage the glass sheet 106. Alternatively, if the edge protectors 102 would not disturb the final look of the glass product, the edge protectors 102 can remain in place even when edge protection is no longer needed.

Each edge protector 102 is a shaped fiber. The shaped fiber includes but is not limited to conventional fiber with core. It is desired that, however, solid fiber without a core is used in certain embodiments. As shown more clearly in FIG. 2, the shaped fiber 102 has a bonding surface 108 for bonding to an edge surface 104 of the glass sheet 106 and a loading surface 110 for receiving and diffusing an impact load directed at the edge surface 104 of the glass sheet 106. In the bonded position, the bonding surface 108 lies along the edge surface 104 of the glass sheet 106 and the loading surface 110 extends out in a direction away from the bonding surface 108 and away from the edge surface 104 of the glass sheet 106. In this configuration, the loading surface 110 will intercept any impact load directed at the edge surface 104 of the glass sheet 106. The shape of the bonding surface 108 may be selected to match that of the edge surface 104 of the glass sheet 106 to which the shaped fiber 102 would be attached. Typically, the bonding surface 108 would be a flat surface since the edge surface 104 would typically be flat. The bonding surface 108 may be smooth or textured. The loading surface 110 may be described as a convex surface. The term "convex surface" is used to describe any surface that extends out in a direction away from the bonding surface 108. As will be shown below with reference to FIGS. 4A-4F, the "convex surface" may or may not be round ("round" is used in the sense of the convex surface being a portion of a spherical surface, elliptical surface, parabolic surface, or other similarly shaped surface). As in the case of the bonding surface 108, the loading surface 110 may be smooth or textured. The cross-sectional shape of the shaped fiber 102 can be further described as being approximately "D" shape or more generally as asymmetrical. Typically, the cross-sectional shape of the shaped fiber 102 is such that the surface area of the loading area 110 is larger than the surface area of the bonding surface 108.

Figure 4A:
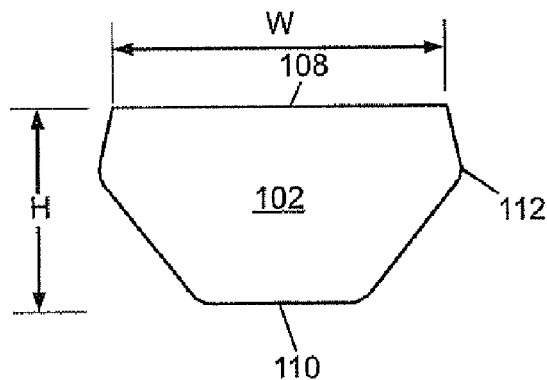
FIG. 4A shows a cross-section of a first example of a protecting fiber.
Figure 4B:
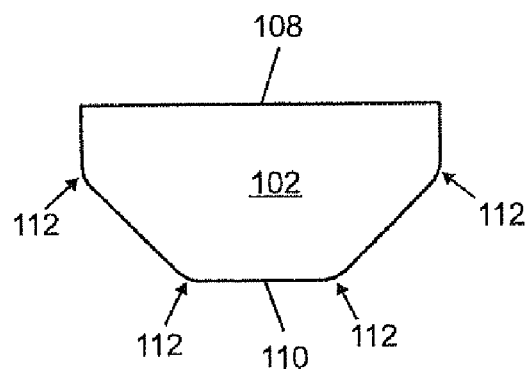
FIG. 4B shows a cross-section of a second example of a protecting fiber.
Figure 4C:
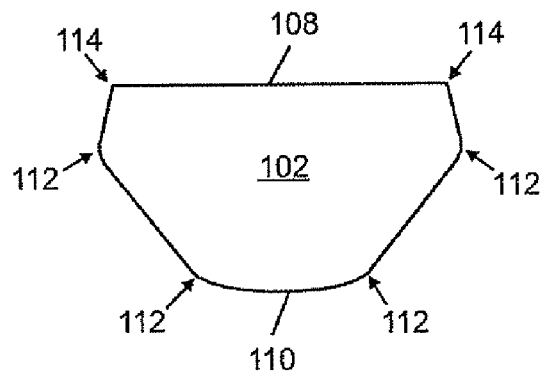
FIG. 4C shows a cross-section of a third example of a protecting fiber.
Figure 4D:
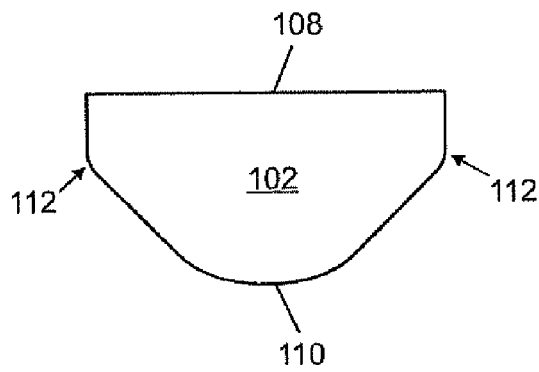
FIG. 4D shows a cross-section of a fourth example of a protecting fiber.
Figure 4E:
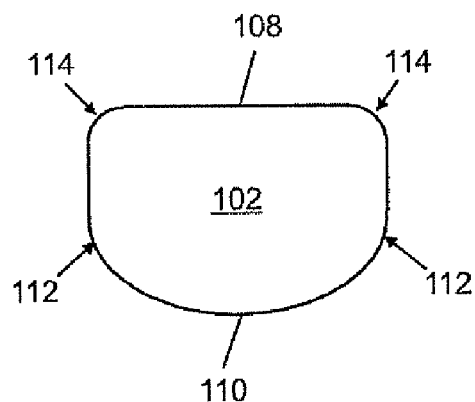
FIG. 4E shows a cross-section of a fifth example of a protecting fiber.
Figure 4F:
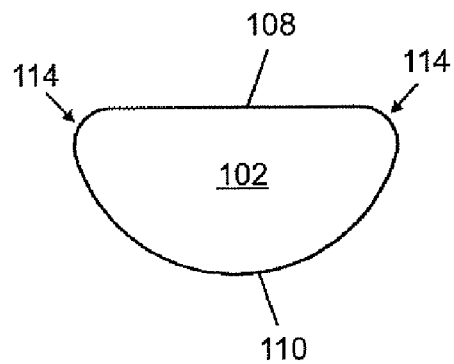
FIG. 4F shows a cross-section of a sixth example of a protecting fiber.

Non-limiting examples of cross-sectional shapes for the shaped fiber 102 that comply with the description above are shown in FIGS. 4A-4F. As shown in FIGS. 4A-4F, the loading or convex surface 10 may be made of a single surface, as shown in FIG. 4F, or a combination of surfaces joined together, as shown in FIGS. 4A-4E. The combination of surfaces may include planar and/or curved surfaces that when joined together form a convex surface as defined above. Where the loading or convex surface 110 includes a combination of surfaces joined together (FIGS. 4A-4E), the corners 112 between adjoining surfaces are rounded in order to avoid stress concentrators in the loading or convex surface 110. The corners 114 between the loading or convex surface 110 and the bonding surface 108 may be rounded (FIGS. 4E and 4F) or may be angular (FIGS. 4A-4D).

Considerations for selecting the height and width of the shaped fiber 102 will be explained with reference to FIG. 4A. In FIG. 4A, the height H and the width W of the shaped fiber 102 are indicated. The width W is measured along the bonding surface 108, and the height H is measured in a direction perpendicular to the bonding surface 108. The width W is given by W=f×T, where f is a factor in a range from 0.8 to 1.2 and T (FIG. 2) is the thickness of the glass sheet (106 in FIG. 2, for example), also the width of the edge surface (104 in FIG. 2, for example). The height H is greater than 0.3×W but less than 3×W. In some examples, the shaped fiber 102 is relatively flexible so that it can be wound on a spool. Such flexibility may be achieved by making the height H of the shaped fiber 102 very small. In some examples, the height H of the spoolable shaped fiber is less than 500 microns. In some other examples, the height H of the spoolable shaped fiber is less than 400 microns. In some examples, the height H of the spoolable shaped fiber is less than 300 microns. Generally speaking, the smaller the height H, the more flexible the shaped fiber 102 would be. However, the flexibility of the shaped fiber 102 should be balanced against the strength of the shaped fiber 102. A spoolable shaped fiber 102 eases the task of bonding the shaped fiber 102 to the edge of the glass sheet (106 in FIG. 2) and saves storage space.

Returning to FIG. 2, the shaped fiber 102 may be made of a material having or engineered to have mechanical properties, e.g., coefficient of thermal expansion and high-temperature strength, similar to that of the glass sheet 106. The shaped fiber 102 can be made of organic or inorganic materials. In some examples, the material of the shaped fiber 102 may be selected from glass, high-strength polymers, plastics, metals, and composites. In some examples, the shaped fiber 102 and the glass sheet 106 have approximately the same coefficient of thermal expansion (CTE) in the temperature range of 0-300° C. By "approximately the same CTE" is meant the CTE difference between the materials of the shaped fiber 102 and the glass sheet 106 is less than 20% of the glass sheet in the temperature range of 0-300° C. In certain embodiments, CTE difference between the materials of the shaped fiber 102 and the glass sheet 106 is less than 10% of the CTE of the glass sheet in the temperature range of 0-300° C. In certain embodiments, CTE difference between the materials of the shaped fiber 102 and the glass sheet 106 is less than 5% of the CTE of the glass sheet in the temperature range of 0-300° C. In certain other embodiments, CTE difference between the materials of the shaped fiber 102 and the glass sheet is less than 2% of the CTE of the glass sheet in the temperature range of 0-300° C. Each shaped fiber 102 is secured to an edge surface 104 of the glass sheet 106 by bonding material 116. Different types of bonding materials may be used to form a strong bond between the shaped fiber 102 and the glass sheet 106, and the type of bonding material used would typically depend on the material of the shaped fiber 102 and the glass sheet 106. In some examples, useful bonding materials are fast setting. In some examples, useful bonding materials are durable at high temperatures, e.g., up to 400° C. In some examples, useful bonding materials have a low viscosity before curing, e.g., lower than 1000 centipoises. In some examples, the low viscosity is less than 500 centipoises In some examples, the low viscosity is less than 10 centipoises. In some examples, the low viscosity is less than 5 centipoises. The bonding material 116 may be selected from a glass frit material, an organic adhesive, or a combination of a glass frit material and an organic adhesive. In some examples, the bonding material 116 is capable of withstanding subsequent processing conditions of the glass sheet 106. Examples of suitable bonding materials are ultraviolet (UV) curable epoxies that are clear without the addition of solvents. When exposed to UV light, the UV-curable epoxy gel cures in seconds to give a tough resilient bond. Commercial examples of high-temperature bonding materials include Resbond™ 940 Fast Setting Adhesive and Durabond™ Metallic Composites, which are capable of operating at 650° C. These epoxy bonding materials can be cured at room temperature or elevated temperature. To shorten the curing time, the bonding material may be heated, e.g., to a temperature in a range from 80° C. to 200° C. Heating may be done using any suitable source, e.g., high power laser beam with operating wavelength at the absorption range of the bonding material. Heating up the bonding material will also reduce the viscosity of the bonding material. A low-viscosity bonding material will make it possible to achieve a thin layer of bonding material 116 between the shaped fiber 102 and the edge surface 104 of the glass sheet 106. If the shaped fiber 102 is made of a glass material, a thin layer of glass frit may be used as the bonding material 116. The glass frit can be designed to operate at high temperatures of up to several hundreds of degrees without performance degradation. In some examples, the glass frit contains one or more absorbing ions chosen from the group including iron, copper, vanadium, and neodymium. The glass frit may also be doped with a filler, e.g., an inversion filler or additive filler, which lowers the coefficient of thermal expansion of the frit to match or substantially match that of the glass sheet 106 and shaped fiber 102. Compositions of several exemplary frits are described in U.S. Pat. No. 6,998,776 (Aitken et al., 2006) and U.S. Pat. No. 7,407,423 (Aitken et al., 2008).

Figure 4G:
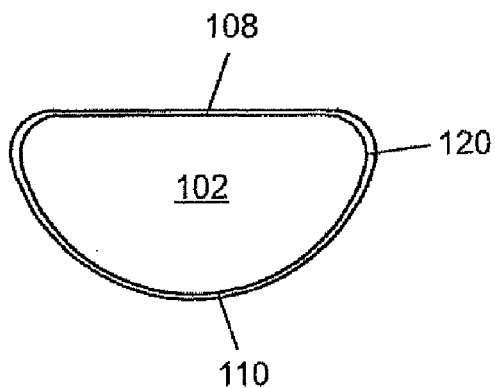
FIG. 4G shows a cross-section of a seventh example of a protecting fiber with protective coating.

A shaped fiber that can be cut into a variety of lengths for use as edge protectors 102 can be made by a variety of processes. In one example, the shaped fiber is a glass fiber made by a fiber draw process. In this process, a glass preform or rod is ground to a shaped preform, where the shape of the preform is as described above for the shaped fiber. Specific examples of cross-sections that the shaped preform may have are shown in FIGS. 4A-4F. The shaped preform is then drawn into a fiber using a conventional fiber drawing process. During the drawing, the temperature and drawing speed are controlled to minimize surface tension so that the fiber shape remains the same or is similar to that of the starting shaped preform. The shaped fiber can be coated with a thin layer of protective coating to protect it from environmental contamination as well as mechanical fatigue. For illustration purposes, FIG. 4G shows the shaped fiber of FIG. 4F with protective coating 120. The thickness of the coating layer may be in a range from 20-100 microns. The coating material may be selected from polymer, silicone, and other materials that can be cured very quickly under UV illumination. The coating may be selected to be one that can be easily removed by mechanical removers or chemical solvents.

The shaped fiber can also be made by an extrusion method. The machine used to extrude the shaped fiber may be similar to an injection molding machine. Raw materials are melted and then forced through a die to form a long fiber. The shape of the die determines the shape of the fiber. Once the fiber is extruded from the die, it is rapidly cooled into a solid shape. The long fiber may be wound on a spool for storage or cut to pieces and stacked together. Unlike the process described above, the extrusion process eliminates the need to first make a shaped preform, thereby reducing fiber manufacturing costs. The fiber formed by this method may also be coated with a thin layer of protective coating as described above (and illustrated in FIG. 4G).

The shaped fiber can also be made by a crucible method. In the crucible method, raw materials are loaded into a heatable crucible having a nozzle on the bottom. The raw materials are melted at high temperature, where they become liquid and flow through the nozzle, rapidly cooling to form a fiber upon exiting the nozzle. The cross-sectional shape of the nozzle determines the shape of the fiber. The fiber formed by this method may also be coated with a thin layer of protective coating as described above (and illustrated in FIG. 4G).

The strength of a shaped fiber made as described above can be enhanced by various strengthening techniques. For example, a thin layer of titania-doped silica glass may be deposited on the surfaces of the shaped fiber (or the shaped fiber may be doped with titanium) to provide excellent resistance to fatigue. U.S. Pat. No. 6,487,879 (Blackwell et al., 2002), for example, describes a method of depositing titania-doped silica glass on a surface to serve as a support. In the fiber draw method of forming the shaped fiber, the preform or the drawn fiber may be doped with Titanium.

A shaped glass fiber may be chemically strengthened by ion exchange. U.S. Pat. No. 5,674,790 (Araujo, 1997), for example, describes chemical strengthening by ion exchange. Typically, the presence of small alkali metal ions such as $Li^+$ and $Na^+$ in the glass fiber structure that can be exchanged for larger alkali metal ions such as $K^+$ render the glass fiber composition suitable for chemical strengthening by ion-exchange. The ion-exchange process typically occurs at an elevated temperature range that does not exceed the transition temperature of the glass. The glass fiber is dipped into a molten bath comprising a salt of an alkali metal, the alkali metal having an ionic radius that is larger than that of the alkali metal ions contained in the glass. The smaller alkali metal ions in the glass are exchanged for the larger alkali metal ions. For example, a glass sheet containing $Na^+$ may be immersed in a bath of molten potassium nitrate ($KNO_3$). The larger $K^+$ present in the molten bath will replace smaller $Na^+$ in the glass. The presence of the large potassium ions at sites formerly occupied by $Na^+$ creates a compressive stress at or near the surface of the glass. The glass fiber is cooled following ion exchange. The depth of the ion-exchange in the glass is controlled by the glass fiber composition. When the strengthening technique is properly executed, a scratch-resistant fiber or fiber surface can be formed.

Another way to enhance the strength of the shaped fiber is by coating the fiber with a protective material as described above. The protective material protects the fiber while the fiber is being transported or spooled. Once the fiber is attached to the edge of the glass sheet, the coating completes its mission and can be removed from the fiber. For this reason, the coating may be one that can be removed from the fiber with conventional mechanical methods, such as burning or with a mechanical tool, or by dissolving in a chemical solvent. Removal of the coating may be before or while applying the fiber to the edges of the glass sheet.

Figure 5A:
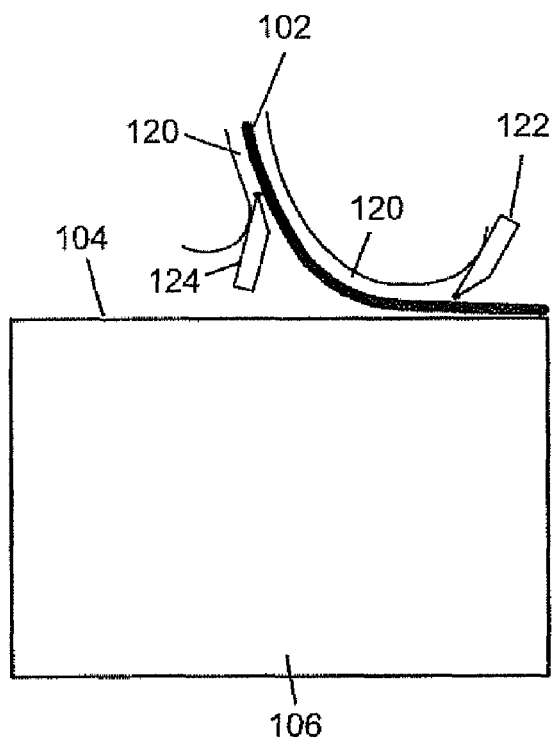
FIG. 5A illustrates a first example of a method of installing a protecting fiber on an edge of a glass sheet.
Figure 5B:
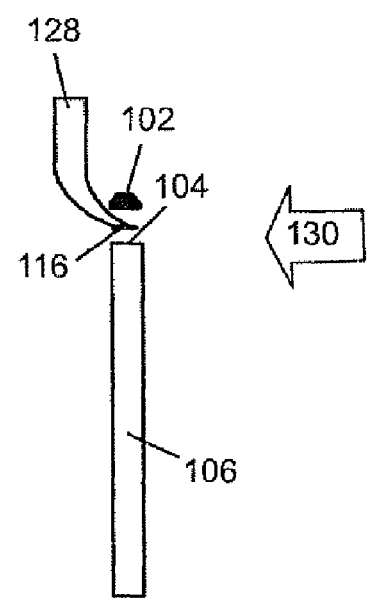
FIG. 5B shows adhesive being deposited between a protecting fiber and an edge of a glass sheet according to the first example of FIG. 5A.
Figure 5C:
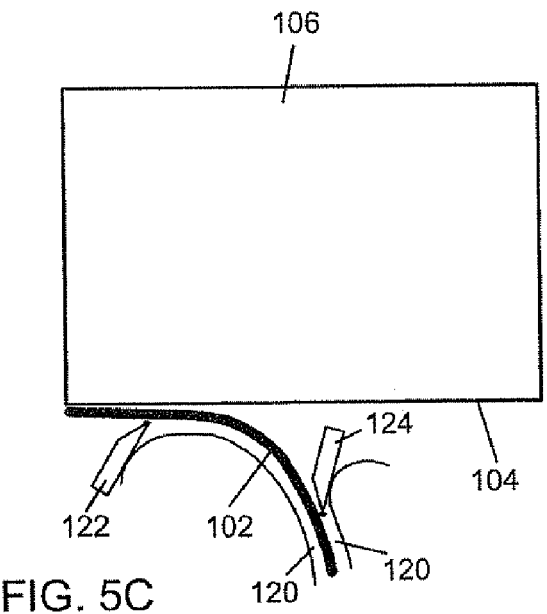
FIG. 5C illustrates a second example of a method of installing a protecting fiber on an edge of a glass sheet.
Figure 5D:
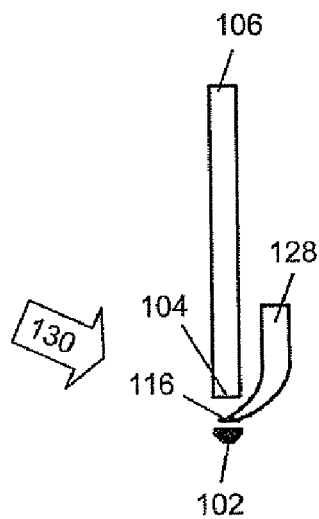
FIG. 5D shows adhesive being deposited between a protecting fiber and an edge of a glass sheet according to the second example of FIG. 5C.

FIG. 5A illustrates a method of positioning a shaped fiber 102 on an edge surface 104 of a glass sheet 106 from the top. The shaped fiber 102 may be unwound from a spool (not shown). In this example, the shaped fiber 102 has a layer of protection coating 120. The protection coating 120 may be removed as the shaped fiber 102 is installed on the edge surface 104 of the glass sheet 106. Mechanical coating removers 122, 124 that remove soft coating without scratching the fiber surface may be used. In FIG. 5B, bonding material 116 is deposited on the sheet edge surface 104 through a nozzle 128 having a slightly smaller opening than the thickness of the glass sheet 106 and that moves along the edge surface 104 of the glass sheet 106. The mechanical coating remover 122 above the shaped fiber 102 acts as a position keeper, keeping the shaped fiber 102 aligned with the edge surface 104 of the glass sheet and applying force to the shaped fiber 102 so that the shaped fiber 102 makes good contact with the edge surface 104 of the glass sheet 106. A similar procedure may be used to position a shaped fiber on an edge surface 104 of the glass sheet 106 from the bottom, as illustrated in FIGS. 5C and 5D. In the method of FIGS. 5C and 5D, bonding material 116 is deposited on the fiber 102 instead of on the edge surface 104 of the glass sheet 102. The fiber 102 with the bonding material 116 is then brought into contact with the edge surface 104 of the glass sheet 106.

Once the shaped fiber 102, the bonding Material 116, and the edge surface 104 are properly positioned, additional processes may be carried out to ensure that a strong bond is formed between the shaped fiber 102 and the edge surface 104 of the glass sheet 106. For example, if the bonding material 116 is a V-curable epoxy, a UV light source 130 (FIGS. 5B and 5D) may be used to cure the bonding material. Alternatively, if the bonding material 116 is a thermally-activated bonding material, the UV light source 130 may be replaced with a suitable heating source which would apply the necessary heat to activate the bonding material. If the bonding material is glass frit, the frit would be melted by an irradiation source, e.g., laser or infrared lamp, in a manner so that the frit forms a strong layer of seal between the edge surface 104 of the glass sheet 106 and the shaped fiber 102. These additional bonding processes may occur as sections of the shaped fiber 102 and bonding material 116 are positioned on the edge surface 104 of the glass sheet 106. The nozzle 128, mechanical removers (122, 124 in FIG. 5A) and UV light source 130 (or heating source or irradiation source as the case may be) may be mounted on a stage (not shown) and moved along the edge surface 104 of the glass sheet 106 so that bonding of the shaped fiber 102 to the edge surface 104 of the glass sheet 102 is a continuous process.

Figure 6A:
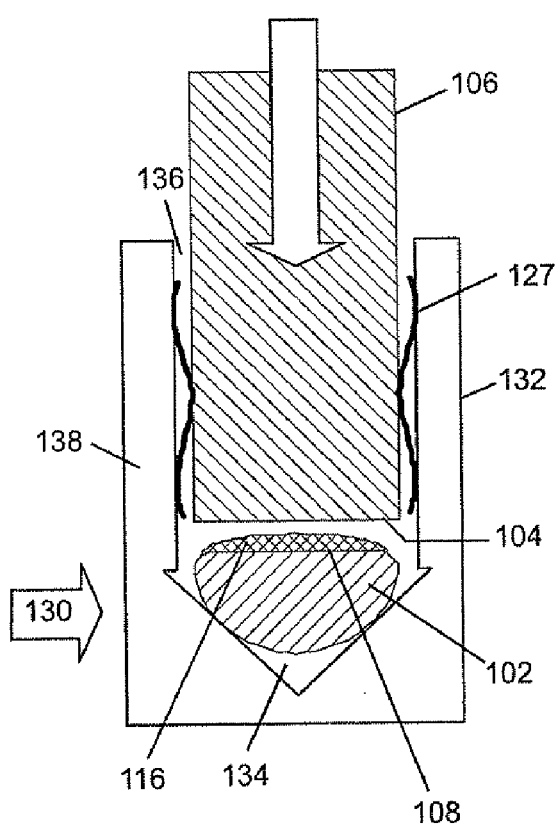
FIG. 6A illustrates a third example of a method of installing a protecting fiber on an edge of a glass sheet.
Figure 6B:
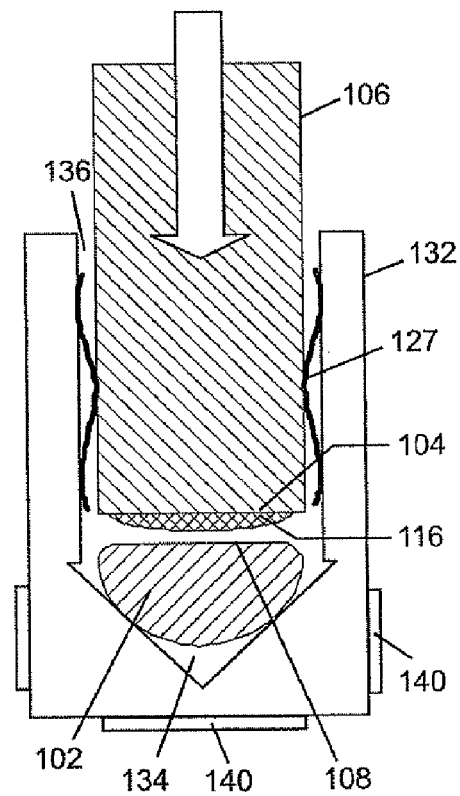
FIG. 6B illustrates a fourth example of a method of installing a protecting fiber on an edge of a glass sheet.

FIG. 6A illustrates another method of attaching a shaped fiber 102 to an edge surface 104 of a glass sheet 106. In this case, the shaped fiber 102 does not include a protective coating that needs to be removed prior to bonding the shaped fiber 102 to the edge surface 104 of the glass sheet 106. In this method, an alignment fixture 132 having a V-groove 134 and a channel 136 above the V-groove 134 is provided. The shaped fiber 102 is positioned in the V-groove 134 with the flat surface 108 up. The bonding material 116 is applied to the bonding surface 108 of the shaped fiber 102. Then, the glass sheet 106 is loaded into the channel 136, and the edge surface 104 of the glass sheet 106 is brought into contact with the bonding surface 108 of the shaped fiber 102. Spring member(s) 127 in the channel 136 centralize the glass sheet 106 within the channel 136 and align the glass sheet 106 with the shaped fiber 102. Once the edge surface 104 of the glass sheet 106 contacts the bonding surface 108 of the shaped fiber 102 through the bonding material 116, additional processes may be carried out to form a strong bond between the edge surface 104 and the shaped fiber, depending on the nature of the bonding material 116 as described above. If the bonding material 116 is a UV-curable epoxy or bonding material, for example, at least one of the walls of the alignment fixture 132, e.g., wall 138, could be transparent to UV light so that UV light from a UV light source 130 can be used to cure the bonding material 116. Alternatively, as illustrated in FIG. 6B, if the bonding material 116 is a thermally-curable bonding material, the alignment fixture 132 could include one or more heating elements 140 to heat up the shaped fiber 102 or the glass sheet 106 so that the bonding material 116 can be cured in a short period. If the bonding material 116 is a glass frit, a suitable method for exposing the bonding material 116 to irradiation can be used.

In FIG. 6B, bonding material 116 can be applied to the edge surface 104 of the glass sheet 106 before the glass sheet 106 is brought into contact with the shaped fiber 102 in the alignment fixture 132. The bonding material 116 may be applied using a relatively fast technique. For example, a container (not shown) longer than the length of the glass sheet 106 may be filled with bonding material and leveled. The glass sheet 106 can then be aligned with the surface of the bonding material in the container so that when the edge surface 104 of the glass sheet 106 touches the bonding material in the container the entire edge surface 104 is wetted with a uniform layer of bonding material. Alternately, bonding material can be applied to the edge surface 104 of the glass sheet 106 using a stamping technique. This technique involves loading the bonding material into a porous material (not shown), e.g., a sponge, and contacting the edge surface 104 of the glass sheet 106 with the porous material. When the porous material is squeezed or under pressure, the bonding material would flow out of the cells and remain on the edge surface 104 of the glass sheet 106 even after the porous material leaves the surface. The glass sheet 106 with the bonding material can then be loaded into the alignment fixture 132 to make contact with the shaped fiber 102. Any additional processes may be used to cure the bonding material as explained above.

EXAMPLES

A finite element analysis (FEA) was used to evaluate the effectiveness of the shaped fiber in protecting a glass sheet from damage when bonded to an edge of the glass sheet by an adhesive material.

Example 1

Figure 7A:
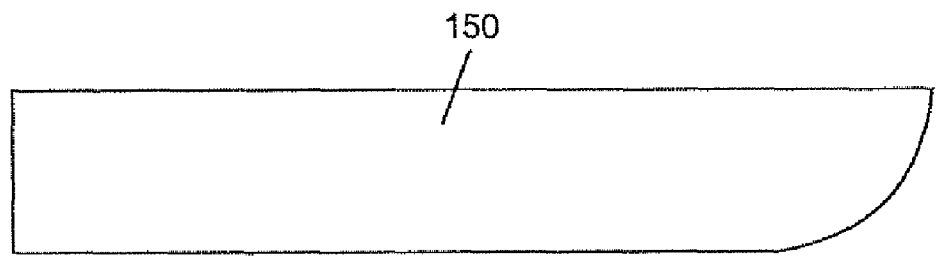
FIG. 7A shows a rounded-edge glass sheet model for a stress analysis.
Figure 7B:
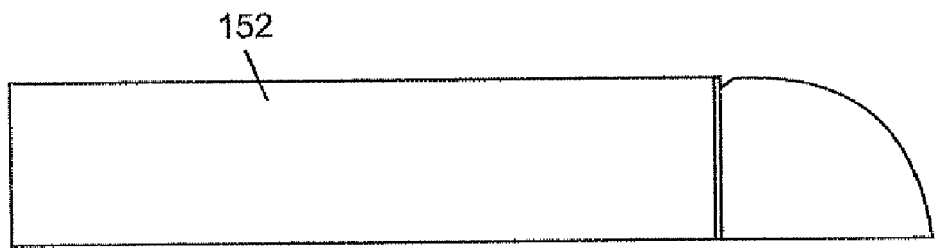
FIG. 7B shows a protected glass sheet model for a stress analysis.

FIGS. 7A and 7B show the models used in the FEA. The model shown in FIG. 7A is a glass sheet 150 with a rounded edge. This model serves as the benchmark since the rounded edge provides the best performance in terms of stress reduction. The model shown in FIG. 7B is a protected glass sheet 152 as described above, with a protecting glass fiber bonded to an edge of a glass sheet by epoxy. Half-symmetry, as shown in FIGS. 7A and 7B, was used in the FEA. The plane strain condition was assumed. Contact interfaces were defined for both models. A displacement loading of 0.001 mm was applied onto the target surface of each contact interface to impose a compression on each glass sheet at an edge of the glass sheet.

Figure 8A:
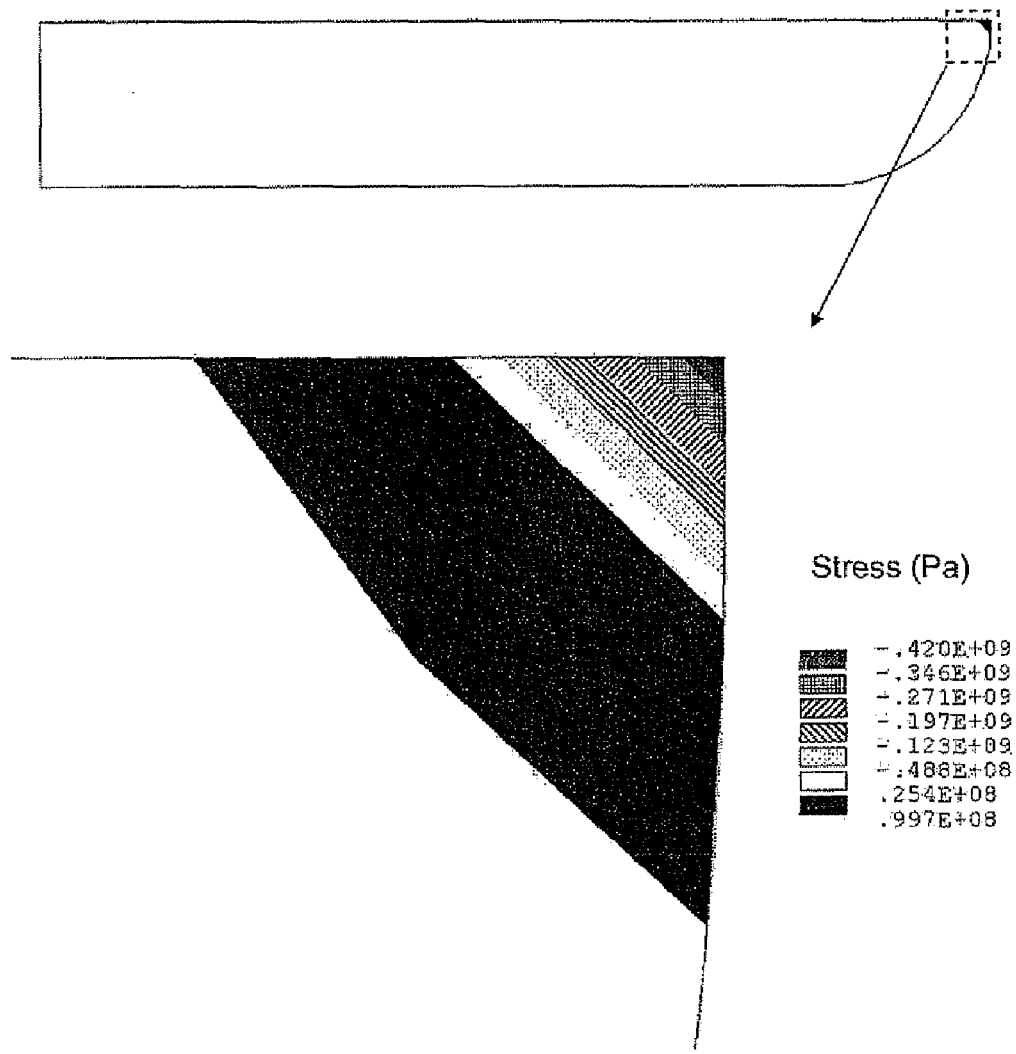
FIG. 8A shows a stress distribution for the model of FIG. 7A.
Figure 8B:
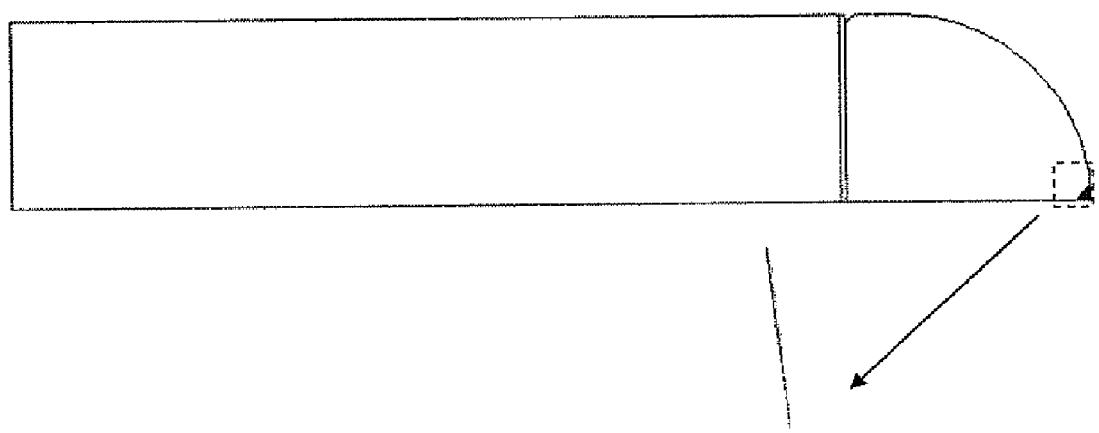
FIG. 8B shows a stress distribution for the model of FIG. 7B.
Figure 8B:
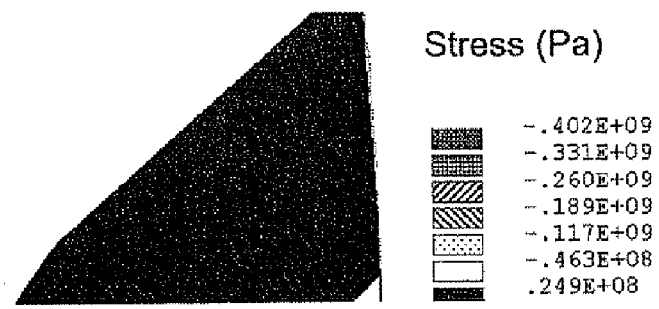
Figure 8B:
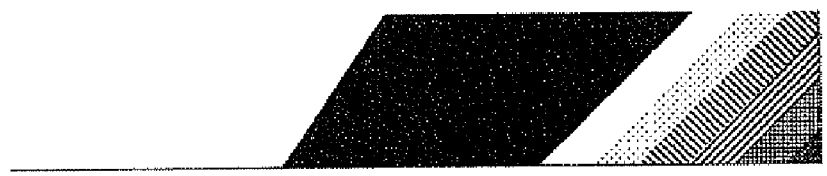
Figure 9A:
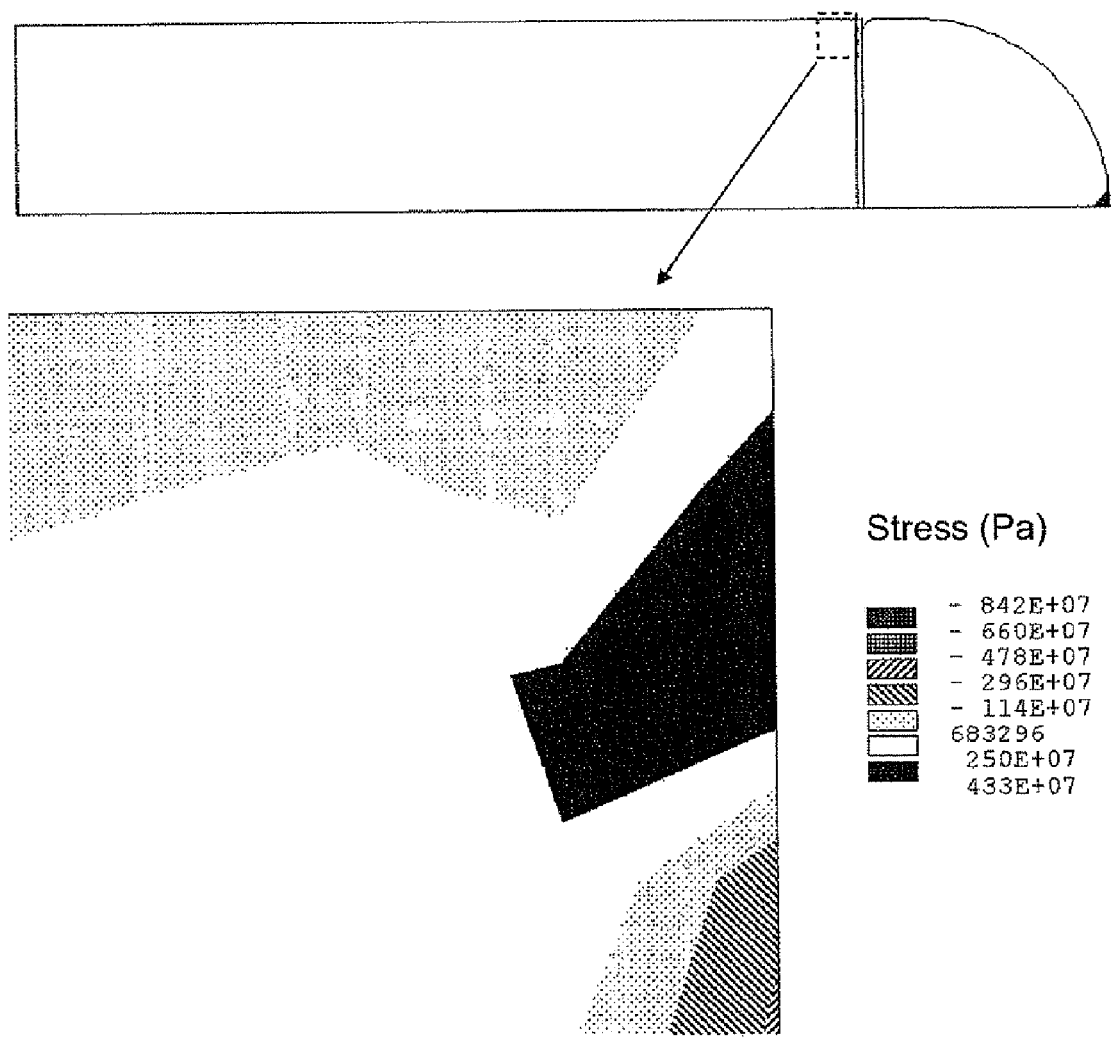
FIG. 9A shows a stress distribution near a corner of the model of FIG. 7B.
Figure 9B:
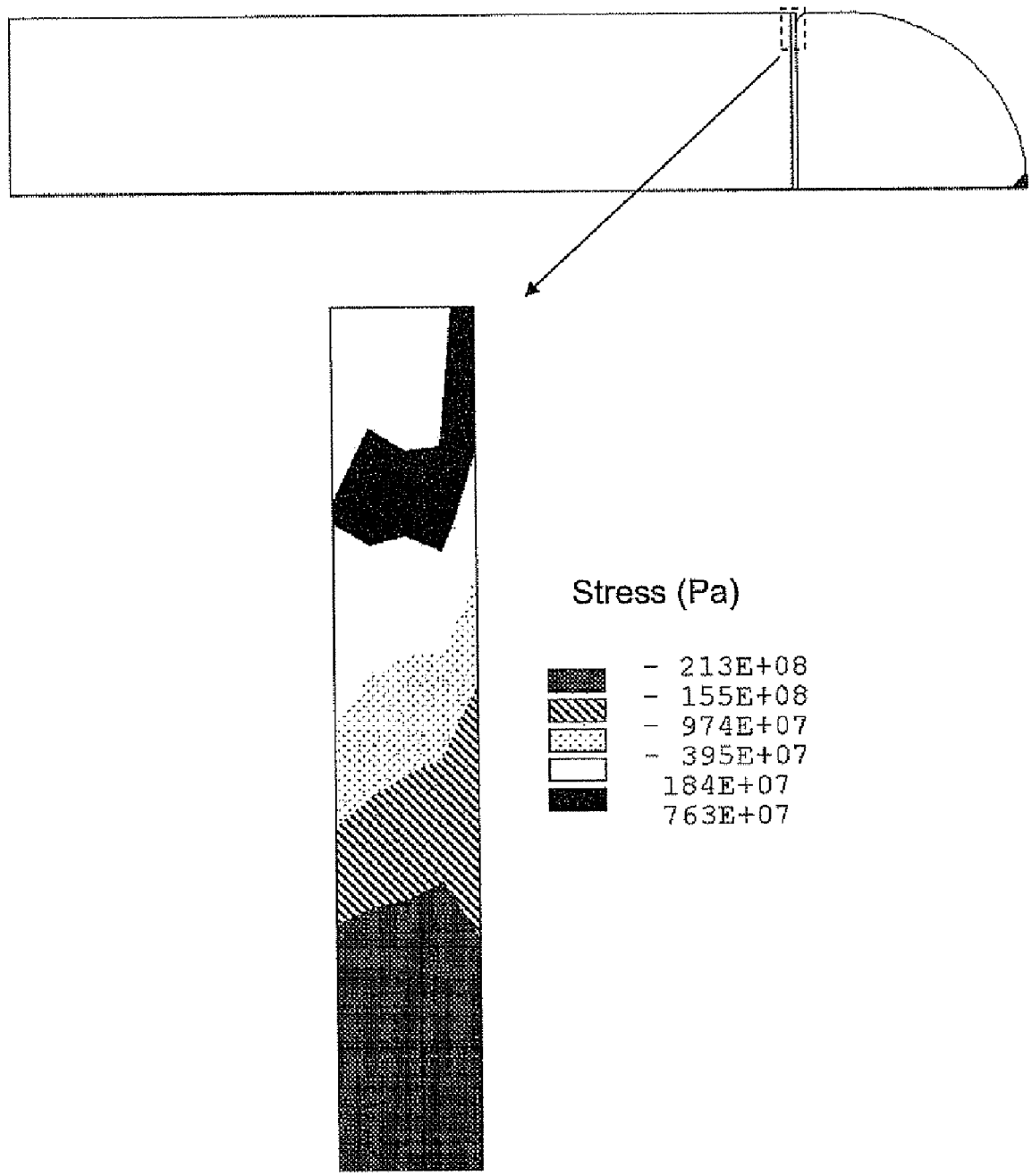
FIG. 9B shows a stress distribution of an epoxy layer of the model of FIG. 7B.

The FEA found the maximum $1^{st}$ principal stress to be 99.7 MPa in the rounded-edge sheet (FIG. 8A) and 96.1 MPa in the protected glass sheet with the shaped fiber (FIG. 8B). The difference in the maximum 1st principal stresses is less than 5%, which is essentially the same in terms of edge protection. In the protected glass sheet with shaped fiber, the maximum $1^{st}$ principal stress was only 4.33 MPa near the corner of the sheet (FIG. 9A). The use of the shaped fiber reduced the maximum stress at the corner by more than 20 times. FIG. 9B shows the stress distribution over the thin layer of epoxy between the glass sheet and the shaped fiber, where the maximum $1^{st}$ principal stress was 7.63 MPa, which is significantly lower than that on the fiber surface. (The maximum $1^{st}$ principal stress of 96.1 MPa reported above for the protected glass sheet occurred at the fiber surface.) The results clearly show that the use of a shaped fiber attached to the glass sheet can significantly reduce crack or damage occurrence at the edge and therefore provide excellent protection to the glass sheet.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A glass sheet assembly, comprising:
a glass sheet having an edge surface;
a shaped fiber having a first surface bonded to the edge surface of the glass sheet and a convex second surface not bonded to the edge surface for receiving a load.

2. A glass sheet assembly according to claim 1, wherein the first surface and the edge surface are essentially flat.

3. The glass sheet assembly according to claim 1, wherein the ratio of the width of the shaped fiber to the width of the edge surface is in the range from 0.8 to 1.2.

4. The glass sheet assembly according to claim 1, wherein the shaped fiber is made of a glass material.

5. The glass sheet assembly according to claim 1, wherein:
the edge surface of the glass sheet has a first impact strength IS1 when not bonded to the shaped fiber;
the glass sheet assembly has a second impact edge strength IS2; and
IS1 is at most half of IS2.

6. The sheet assembly according to claim 1, wherein:
the edge surface is as-cut and without further grinding and polishing.

7. The sheet assembly according to claim 1, wherein:
the edge surface, if rounded and ground, has a first static contact strength SC1;
the glass sheet assembly has a second static contact strength SC2; and
SC2≧SC1.

8. The glass sheet assembly according to claim 1, wherein a difference between the coefficient of thermal expansion of the shaped fiber and the coefficient of thermal expansion of the glass sheet is less than 10% in the temperature range of 0-300° C.

9. The glass sheet assembly according to claim 1, wherein the bonding material bonding the shaped fiber to the edge surface is selected from (i) a glass frit material; (ii) an organic adhesive; and (iii) a combination of (i) and (ii).

10. The glass sheet assembly according to claim 1, wherein the shaped fiber essentially encloses all the edge surfaces of the glass sheet.

11. The glass sheet assembly according to claim 1, wherein the glass sheet has a rounded corner protected by the shaped fiber.

12. The glass sheet assembly according to claim 1, wherein the shaped fiber is a glass fiber, and wherein the surface of the glass fiber is doped by Ti.

13. The glass sheet assembly according to claim 1, wherein the shaped fiber has an ion-exchanged surface.

14. A method of protecting a glass sheet having an edge surface to be protected, comprising:
(I) providing a shaped fiber having a first surface to be bonded to the edge surface and a convex second surface;
(II) positioning the first surface of the shaped fiber in opposing relation to the edge surface of the glass sheet; and
(III) bonding the first surface of the shaped fiber to the edge surface of the glass sheet.

15. The method according to claim 14, wherein in step (I), the first surface of the fiber is essentially planar.

16. The method of claim 14, wherein:
in step (I), the first surface of the shaped fiber comprises a protective coating; and
prior to step (III), the protective coating is removed.

17. The method of claim 14, wherein step (I) comprises:
(Ia) providing a fiber preform having a D-shaped cross-section; and
(Ic) drawing the D-shaped fiber preform into a fiber having an approximately D-shaped cross-section.

18. The method according to claim 17, wherein in step (Ia), the fiber preform is made of an inorganic glass material.

19. The method of claim 17, wherein step (I) further comprises, after step (Ic):
(Id) subjecting the D-shaped fiber to ion-exchange.

20. The method of claim 17, wherein step (I) further comprises, between step (Ia) and step (Ie):
(Ib) subjecting the D-shaped fiber preform to surface Ti-doping.

* * * * *